United States Patent [19]
Kraus

[11] 3,752,542
[45] Aug. 14, 1973

[54] HYDROSTATIC THURST BEARING
[75] Inventor: Charles E. Kraus, Austin, Tex.
[73] Assignee: Excelermatic, Inc., Rochester, N.Y.
[22] Filed: Apr. 19, 1972
[21] Appl. No.: 245,473

[52] U.S. Cl. .................................................. 308/9
[51] Int. Cl. ............................................ F16c 17/16
[58] Field of Search ............................... 308/9, 122

[56] References Cited
UNITED STATES PATENTS
3,119,639   1/1964   Adams.................................... 308/9

Primary Examiner—Charles J. Myhre
Assistant Examiner—Frank Susko
Attorney—T. L. Bowes

[57] ABSTRACT

A hydrostatic thrust bearing for supporting a load member on a support member is described wherein one of the members has a cavity into which pressurized fluid is admitted and which has a seal ring disposed therein movably relative to the other member, the adjacent surfaces of the seal ring and the other member forming a limited leakage fluid path. At least one of these surfaces has an annular control recess formed therein to which pressurized fluid is admitted when the load of the load member and, accordingly, the pressure of the fluid in the cavity decreases thereby to lift the seal ring and increase the cross-section of the limited leakage fluid path.

5 Claims, 1 Drawing Figure

PATENTED AUG 14 1973 3,752,542
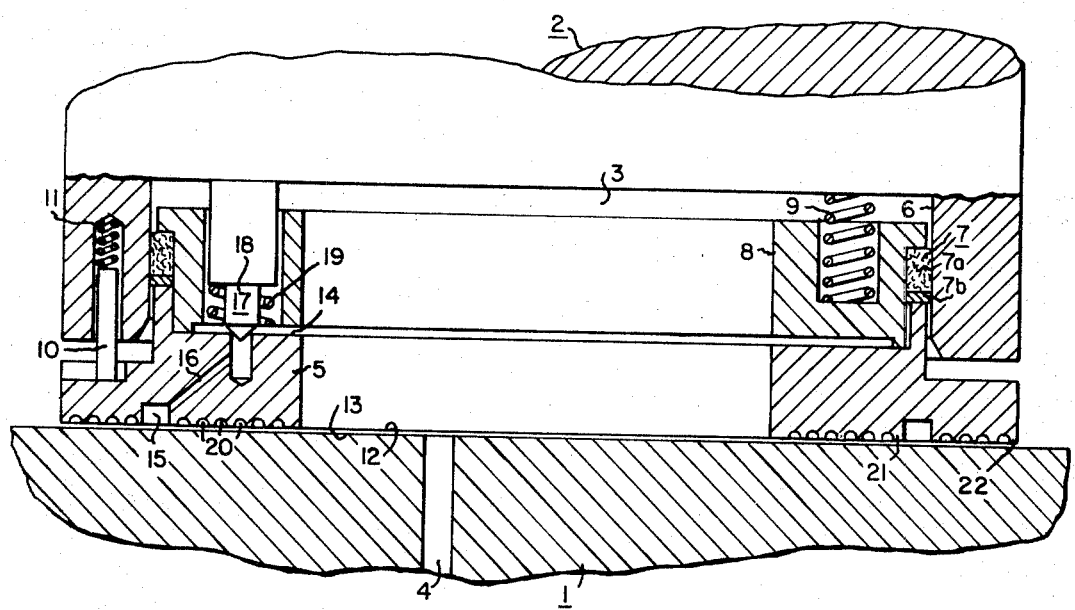

HYDROSTATIC THRUST BEARING

BACKGROUND OF THE INVENTION

Hydrostatic thrust bearings usually have a cavity between a load member and its support member into which pressurized fluid is admitted to support the load member. The pressurized fluid is permitted to escape from the cavity through a path formed between wide, oppositely disposed lands integral with the support and the load members. The pressurized fluid is supplied by a constant volume pump driven, for example, by the load member. Pressurized fluid may also be derived from a high pressure fluid source, the admission of pressurized fluid then being limited by orifice or capillary flow control.

In such arrangements, however, the leakage flow rate varies with varying load and with varying speed to such an extent that, under certain circumstances, there is not sufficient leakage flow to cool the bearing satisfactorily, or that physical contact occurs between parts of the bearing thereby causing increased friction and production of heat. These effects can, of course, be avoided by a relatively large supply of pressurized fluid to the bearing, but this increases the fluid flow during normal operation beyond real need and requires excess pump capacity which causes power losses.

U.S. Pat. No. 3,119,639 discloses a hydrostatic bearing in which a ring is movably disposed in a pressurized fluid cavity and forced toward the bearing surface opposite the cavity to limit leakage of fluid from the cavity and insure adequate spacing of the bearing parts.

In an arrangement as shown in this applicant's earlier U.S. Pat. No. 3,619,016, there is provided a floating ring forming a limited leakage fluid flow seal and a control valve for the admission of pressurized fluid to the bearing structure, the control valve being opened as the supported member approaches the supporting member.

Limited leakage fluid flow seals are widely used where friction must be avoided, where a limited fluid flow is desired and under conditions not suitable for the normal seal materials. A discussion of such seal arrangements is found in the Paper H6 of The British Hydromechanics Research Association, Cranfield, Bedford. However, for some applications, it is a disadvantage of all known arrangements that the leakage flow increases substantially with the bearing load whereas, during operation under small load, the leakage flow may not be sufficient.

SUMMARY OF THE INVENTION

To overcome these problems, the present invention provides in a hydrostatic thrust bearing, having a pressurized fluid cavity formed between a support and a load member a leakage flow control ring which is movably disposed in the cavity and has a control recess in its seal face to which pressurized fluid is admitted when the load decreases and the distance between the support and the load members increases. This arrangement causes the leakage flow control ring to lift off whenever the bearing load and the pressure in the pressurized fluid cavity decreases so that the cross-section of the limited leakage fluid flow path along the seal face of the leakage flow control ring is increased and the leakage flow rate is maintained inspite of the reduced pressure in the pressurized fluid cavity.

BRIEF DESCRIPTION OF THE DRAWINGS

The sole FIGURE is a cross-sectional view of a hydrostatic thrust bearing according to the invention.

DESCRIPTION OF THE PREFERRED EMBODIMENT

The FIGURE shows a hydrostatic bearing consisting of a support member 1 and a load member 2 which has a cavity 3 formed therein to which pressurized fluid is admitted through a fluid supply passage 4 which preferably extends through the stationary support member 1.

A seal ring 5 is movably disposed in the cavity 3 and fluid leakage from the cavity 3 along the side walls 6 is prevented by a sealing structure 7 consisting of a gasket 7a and a flat ring 7b. The sealing structure 7 is held in position by an annular member 8 which is forced in engagement with the seal ring 5 by springs 9. Pins 10 extending from the seal ring 5 into openings 11 in the load member 2 prevent relative rotation between the load member 2 and the seal ring 5.

The seal ring 5 and the support member 1 have oppositely disposed seal faces 12 and 13 defining therebetween a limited leakage fluid passage through which pressurized fluid escapes from the cavity 3 at a pressure which gradually diminishes from the pressure in the cavity 3 to the environmental pressure. The rear side 14 of the seal ring 5 is exposed to the pressurized fluid in the cavity 3 which forces the seal ring 5 toward the seal face 13. To fully offset the forces effective on the rear side of the seal ring 5 — fluid pressure and spring forces — the seal faces 12 and 13 extend outwardly beyond the cavity walls 6.

Preferably the seal ring 5 has a control recess 15 from which a passage 16 leads to a valve arrangement 17. The valve arrangement 17 may be a needle valve including a needle 18 extending from the load member 2 toward the opening of passage 16 such that the passage 16 is closed when the load member moves toward the support member 1 as a result of an increased load. When the load decreases the load member 2 moves away from the support member 1 and the passage 16 is opened permitting pressurized fluid to enter the control recess 15. This increases the fluid pressure in the path between the seal faces 12 and 13 relative to the pressure on the rear side of the seal ring 5 and lifts the seal ring 5 thereby providing a larger fluid flow path between the seal faces at reduced load.

The pressurized fluid is preferably provided by a constant displacement pump which may be mechanically coupled to the load member or another driving means.

Although only one valve arrangement is shown in the drawing, there are preferably provided at least three such valve arrangements equidistantly spaced from each other. Also springs 19 may be provided which in cooperation with the springs 9 force the sealing ring 5 toward the support member 1.

In a preferred embodiment of the invention the face 12 of the sealing ring 5 has annular grooves 20 thereby to form a labyrinth-type seal between the seal faces 12 and 13. Small radial passages may be present to provide communication between adjacent grooves and with the cavity 3 to insure lift-off of the seal ring during start up. However, no radial passages are provided in the lands 21 and 22, especially not in the outer land 22, to facilitate fluid pressure build-up between the seal faces 12, 13 for lift-off.

The grooves 20 may also be formed as a continuous spiral path through which the fluid may pass when the sealing ring 5 rests on the support member 1 and its lands abut the sealing face 13. Again, however, the outer land 22 forms a closed annulus restraining the fluid passing through the space between the seal faces 12, 13.

The hydrostatic bearing according to the invention is, of course, not limited to the arrangement as described. It is, for example, possible to provide the pressurized fluid cavity in the support member and arrange the seal ring in the cavity in the support member with the seal face of the seal ring being disposed opposite a corresponding seal face formed on the load member. Also, the seal ring may have a flat seal face and the grooves may be formed in the opposite seal face.

What is claimed is:

1. In a hydrostatic thrust bearing for supporting a load member on a support member by a pressurized fluid introduced into a cavity formed in one of said members, a seal ring disposed in said cavity and having a seal face opposite a seal face formed on the other member and being movable relative thereto to provide between said seal faces a limited leakage fluid path of variable cross-section, at least one of said seal faces having an annular control recess formed therein, and means for admitting additional fluid to said annular control recess depending on the position of said load member relative to said support member.

2. A bearing as claimed in claim 1, wherein said cavity is formed in said load member and said annular control recess is formed in said seal ring.

3. A bearing as claimed in claim 1, wherein said means for admitting additional fluid to said annular control recess includes a communication path between said cavity and said control recess and at least one valve means disposed in said communication path and controlled by said load member for regulating admission of said additional fluid to said control recess.

4. A bearing as claimed in claim 3, wherein said valve means is a needle valve having its needle associated with said load member and extending into said communication path for restricting admission of fluid to said control recess when the load of said load member increases.

5. A bearing as claimed in claim 1, wherein at least one of said seal faces has annular grooves and at least the grooves adjacent the cavity are interconnected to permit fluid pressure build-up between said seal faces.

* * * * *